US008609570B2

(12) United States Patent
Schwarzer et al.

(10) Patent No.: US 8,609,570 B2
(45) Date of Patent: Dec. 17, 2013

(54) METHOD FOR PRODUCING A PLATINUM CATALYST PRECURSOR

(75) Inventors: Hans-Christoph Schwarzer, Höhenkirchen-Siegertsbrunn (DE); Arno Tissler, Tegernheim (DE); Markus Hutt, Rosenheim (DE)

(73) Assignee: Sud-Chemie IP GmbH & Co. KG, Munich (DE)

( * ) Notice: Subject to any disclaimer, the term of this patent is extended or adjusted under 35 U.S.C. 154(b) by 174 days.

(21) Appl. No.: 12/992,326

(22) PCT Filed: May 11, 2009

(86) PCT No.: PCT/EP2009/003333
§ 371 (c)(1),
(2), (4) Date: Dec. 30, 2010

(87) PCT Pub. No.: WO2009/138204
PCT Pub. Date: Nov. 19, 2009

(65) Prior Publication Data
US 2011/0124490 A1    May 26, 2011

(30) Foreign Application Priority Data
May 14, 2008  (DE) .......................... 10 2008 023 472

(51) Int. Cl.
*B01J 21/00*  (2006.01)
*B01J 29/00*  (2006.01)
*B01J 23/00*  (2006.01)

(52) U.S. Cl.
USPC ............ 502/74; 502/104; 502/252; 502/304; 502/262; 502/263; 502/326; 502/327; 502/328; 502/329; 502/332; 502/334; 502/339; 502/349; 502/350; 502/351; 502/355; 502/415; 502/439

(58) Field of Classification Search
USPC .................. 502/74, 104, 252, 304, 262, 263, 502/326–329, 332, 334, 339, 349–351, 355, 502/415, 439
See application file for complete search history.

(56) References Cited

U.S. PATENT DOCUMENTS 3,992,331  A        11/1976  Petrow et al.
4,059,541  A  *    11/1977  Petrow et al. ................... 516/88
(Continued)

FOREIGN PATENT DOCUMENTS

DE         2229331        1/1973
GB         1357494        6/1974
(Continued)

OTHER PUBLICATIONS

Angelika Jourdan, International Search Report in PCT/EP2009/003333, Feb. 1, 2010, 12 pages, European Patent Office, Rijswijk, Netherlands.

(Continued)

*Primary Examiner* — Cam N. Nguyen
(74) *Attorney, Agent, or Firm* — Florek & Endres PLLC

(57) ABSTRACT

The present invention relates to a method for producing a precursor of a supported platinum catalyst. To provide a method for producing a platinum catalyst precursor, by means of which supported platinum catalysts can be produced which have a relatively high activity, a method is proposed, comprising the steps of:
a) impregnating an open-pored support material with platinum sulphite acid;
b) calcining the impregnated zeolite material under a protective gas.

15 Claims, 6 Drawing Sheets

(56) References Cited

U.S. PATENT DOCUMENTS

Figure 1:
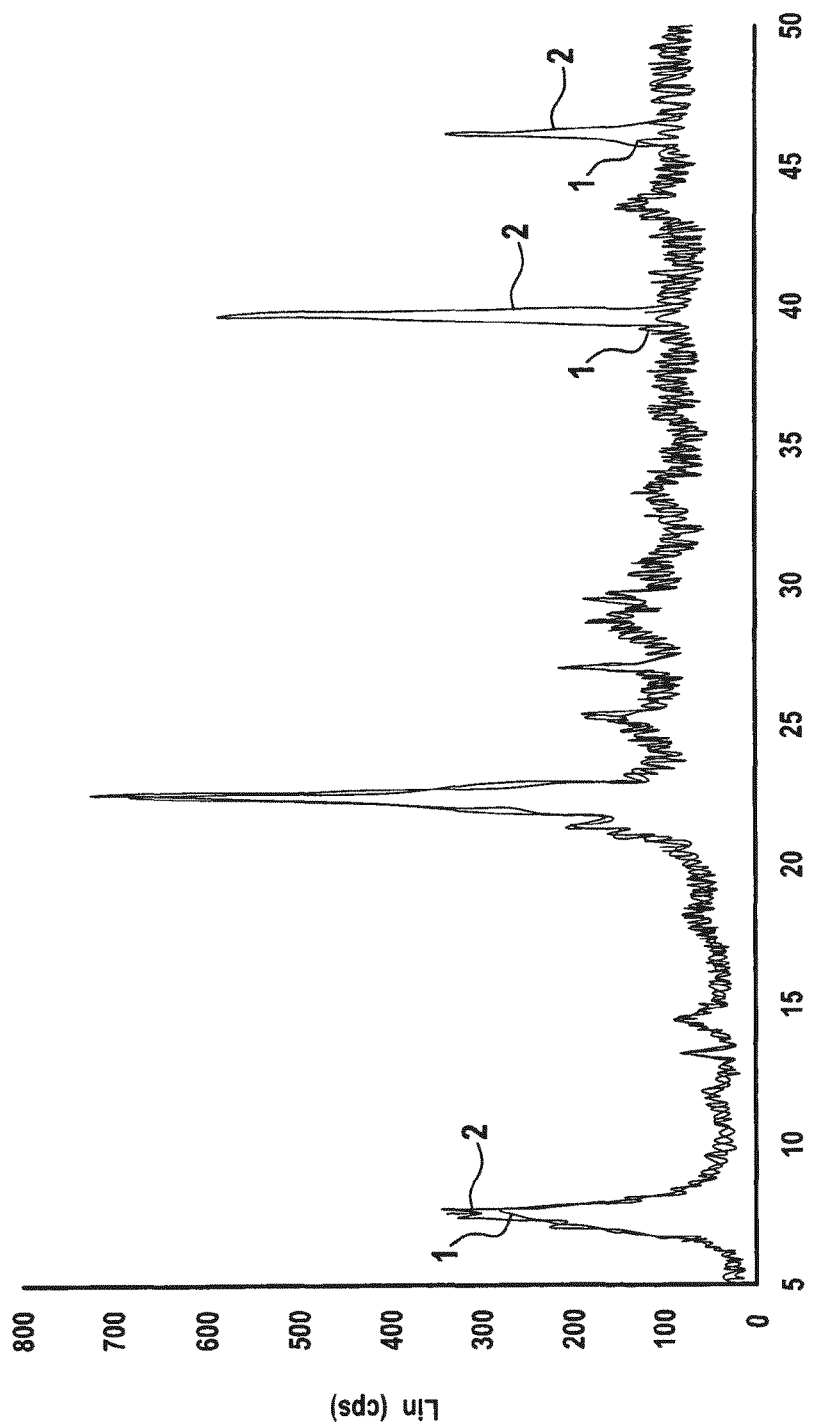

| | | | |
|---|---|---|---|
| 4,082,699 A * | 4/1978 | Petrow et al. | 502/325 |
| 4,102,819 A * | 7/1978 | Petrow et al. | 502/262 |
| 4,912,072 A | 3/1990 | Mallouk et al. | |
| 5,977,012 A * | 11/1999 | Kharas et al. | 502/326 |
| 2004/0028589 A1 * | 2/2004 | Reisinger et al. | 423/240 S |
| 2004/0175313 A1 * | 9/2004 | Foor et al. | 423/219 |
| 2006/0211569 A1 | 9/2006 | Dang et al. | |

FOREIGN PATENT DOCUMENTS

| | | |
|---|---|---|
| GB | 2096482 | 10/1982 |
| JP | S48-009996 | 2/1973 |
| JP | S55-130802 | 10/1980 |
| JP | S56-024046 | 3/1981 |
| JP | 11-506698 A | 6/1999 |
| JP | 2003-033658 | 2/2003 |
| JP | 2006-507637 | 3/2006 |
| WO | 94/06546 | 3/1994 |
| WO | 03/041846 | 5/2003 |
| WO | 2005/023398 | 3/2005 |

OTHER PUBLICATIONS

J.R. Regalbuto et al., "An Evaluation of Pt Sulfite Acid (PSA) as Precursor for Supported Pt Catalysts", Topics in Catalysis, Oct. 2006, vol. 39(3-4): 237-243.

P. Kubanek et al., "Parallel IR Spectroscopic Characterization of CO Chemisorption on Pt Loaded Zeolites", Microporous and Mesoporous Materials, 2005, vol. 77, pp. 89-96.

D.S. Coombs et al., "Recommended Nomenclature for Zeolite Minerals: Report of the Subcommittee on Zeolites of the International Mineralogical Association, Commission on New Minerals and Mineral Names", The Canadian Mineralogist, vol. 35, pp. 1571-1606 (1997).

Material Safety Data Sheet for Platinum sulfite acid solution (15.3% Pt), prepared Jan. 2, 2004, revised Apr. 12, 2007 by Strem Chemicals, Inc., Newburyport, MA, U.S.A.

CAS Registry Record for 61420-92-6 Platinum Sulfite Acid, Nov. 16, 1984.

Yiming, You; English translation of Notification of Second Office Action in Chinese Application No. 200980108152.0; May 16, 2013; 16 pages; The State Intellectual Property Office of the People's Republic of China; Beijing, China.

* cited by examiner

METHOD FOR PRODUCING A PLATINUM CATALYST PRECURSOR

This application is a U.S. National Stage filing under 35 U.S.C. §371 of International Application No. PCT/EP2009/003333, filed May 11, 2009, which in turn claims priority to German Patent Application No. 10 2008 023 472.9, filed May 14, 2008

The present invention relates to a method in particular for producing a precursor of a supported platinum catalyst.

Supported noble metal catalysts, in which relatively small noble metal particles are deposited on the surface of a solid support, are used in particular in synthetic chemical and petrochemical processes in order to convert a wide variety of educts into desired intermediate products or end products or to chemically refine different cuts of petroleum processing. In addition, supported noble metal catalysts are in particular also used as oxidation catalysts in the purification of exhaust gases from combustion engines.

Supported catalysts loaded with noble metal are normally produced by means of a multi-stage method. For example, in a first step a support material is impregnated with a noble metal salt solution of the desired noble metal. After the removal of the solvent from the support material in a subsequent step, the support material is then calcined in a further step, wherein the noble metal can be converted to an oxide form by thermal treatment. Then, in a further step, the noble metal component is converted to the catalytically active, highly dispersed noble metal of oxidation state 0, for example by means of hydrogen, carbon monoxide or wet-chemical reducing agent. The supported noble metal catalyst can be stabilized for storage purposes in a final step, for example by wet stabilization by means of an oil or by dry stabilization by means of preoxidation (passivation) of the deposited noble metal particles.

The activity of supported noble metal catalysts normally depends on the size of the noble metal particles. The supported noble metal catalysts known in the state of the art have the disadvantage that they become less active in the course of their use because of a sintering of the noble metal particles into larger units accompanied by a reduction in catalytically active surface. The speed of this so-called thermal ageing process depends on the temperature level at which the catalyst is used. To be precise, as the operating temperature increases so does the speed of said ageing process, which is assumed to be caused by an increased mobility of the noble metal particles on the support material surface accompanied by an increased tendency to sinter.

A large number of attempts have already been made in the state of the art to produce catalysts which have a high activity when used at high temperatures and are subject to only a low thermal ageing process. Kubanek et al., "Microporous and Mesoporous Materials 77 (2005) 89-96", for example describe the production of a supported platinum catalyst by impregnating a zeolite of the structure type MFI (SH27) with the Pt precursor compound $Pt(NH_3)_4(NO_3)_2$ and then calcining the zeolite loaded with the precursor compound in a protective gas atmosphere. When $Pt(NH_3)_4(NO_3)_2$ is used, autoreduction occurs at relatively high temperatures. However, the thus-produced supported platinum catalyst has a relatively low activity as well as a relatively high tendency to thermal ageing.

An object of the present invention is therefore to provide a method in particular for producing a platinum catalyst precursor, by means of which supported platinum catalysts can be produced which have an increased activity compared with the platinum catalysts known from the state of the art.

Furthermore, an object of the present invention is to provide a method for producing a platinum catalyst precursor, by means of which supported platinum catalysts can be produced which display a relatively low tendency to thermal ageing and accordingly maintain their catalytic activity almost unchanged over long service lives.

This object is achieved by a method comprising the steps of:
a) impregnating an open-pored support material with platinum sulphite acid;
b) calcining the impregnated support material under a protective gas.

It was surprisingly discovered that, by means of the method according to the invention, a platinum catalyst precursor can be obtained which, after the conversion of the platinum component to the oxidation state 0, results in a supported platinum catalyst which is characterized by an increased activity.

In addition, it was surprisingly established that, by impregnating an open-pored support material with platinum sulphite acid and calcining the impregnated support material in a protective gas atmosphere, a platinum catalyst precursor can be obtained by means of which, by reduction of the platinum component into the oxidation state 0, a supported platinum catalyst can be produced which displays a very low tendency to thermal ageing at relatively high temperatures and maintains its catalytic activity largely unchanged over relatively long service lives.

These advantages of a platinum catalyst produced via the method according to the invention are brought to bear in particular during use at high temperatures, such as for example in oxidation catalysis in which corresponding platinum catalysts produced in conventional ways are prone to a rapid thermal ageing because of a high mobility of the platinum particles caused by the predominantly high temperatures accompanied by an increased tendency to sinter.

Platinum catalyst precursors and from these, following reduction, finally supported platinum catalysts can be produced by means of the method according to the invention, i.e. supported platinum catalysts which comprise Pt of oxidation state 0. The platinum catalysts can be both metal catalysts which, in addition to Pt of oxidation state 0, contain one or more additional transition metals of any oxidation state or of oxidation state 0, preferably noble metals, and pure platinum catalysts which contain only Pt of oxidation state 0 as catalytically active metal. If, in addition to Pt, a further transition metal of oxidation state 0 is also present in the platinum catalyst, the metals can be present in the form of particles of pure metal or in the form of alloy particles. To produce platinum catalysts which, in addition to Pt, also comprise at least one further transition metal of oxidation state 0, e.g. Ag, in the framework of the method according to the invention the open-pored support material can for example be impregnated with platinum sulphite acid and with a further corresponding transition metal compound before the metal components are converted to the oxidation state 0.

It is pointed out that the catalysts obtainable via the method according to the invention are not limited to catalysts in which only Pt is present as metal. It is also conceivable that, in addition to platinum, metal oxides that are difficult to reduce are also present.

In one step of the method according to the invention, the open-pored support material is impregnated with platinum sulphite acid. Platinum sulphite acid is known in the state of the art and is often called "PSA" there. Platinum sulphite acid is assigned the Chemical Abstract Number 61420-92-6 and is freely available on the market, for example from Heraeus, Hanau, Germany as 10.4% platinum sulphite acid solution.

In the method according to the invention, the platinum sulphite acid is preferably used in the form of an aqueous platinum sulphite acid solution containing 0.01 to 15 wt.-% Pt (metal). It is further preferred to use the platinum sulphite acid in the form of an aqueous platinum sulphite acid solution containing 0.1 to 8 wt.-% Pt (metal) in the method according to the invention, more preferably in the form of an aqueous platinum sulphite acid solution containing 1 to 6 wt.-% Pt (metal) and particularly preferably in the form of an aqueous platinum sulphite acid solution containing 2.5 to 3.5 wt.-% Pt (metal). It is most preferred to use the platinum sulphite acid in the form of an aqueous platinum sulphite acid solution containing 2.8 to 3.3 wt.-% Pt (metal) in the method according to the invention.

According to a preferred embodiment of the method according to the invention, the method furthermore comprises the step of: converting the platinum component of the calcined platinum sulphite acid to the oxidation state 0. The support material impregnated with platinum sulphite acid is subjected to a reducing step after the calcining. Where the method according to the invention comprises the above-named step of converting the platinum component of the calcined platinum sulphite acid to the oxidation state 0, the method according to the invention relates to a method for producing a supported platinum catalyst, wherein the platinum catalyst can comprise, in addition to Pt of oxidation state 0, one or more further transition metals, in particular noble metals, of oxidation state 0.

The platinum component of the calcined platinum sulphite acid can be converted to the oxidation state 0 both by wet-chemical route, i.e. by means of a solution with a reducing effect, and by dry-chemical route, i.e. by means of a gas with a reducing effect. It is preferred according to the invention that the platinum component of the calcined platinum sulphite acid is converted to the oxidation state 0 by dry-chemical route. As a result there is the possibility of carrying out the reduction in a procedurally simple way at relatively high temperatures, which promotes a rapid and complete reduction of the platinum component.

According to a further preferred embodiment of the method according to the invention, it is provided that the platinum component of the calcined platinum sulphite acid is converted to the oxidation state 0 at a temperature of at least 100° C. In this connection, it is preferred that the platinum component is reduced at a temperature of from 100° C. to 400° C., more preferably at a temperature of from 200° C. to 350° C., further preferably at a temperature of from 275° C. to 325° C. and particularly preferably at a temperature of 300° C.

As has already been stated above, it can be preferred according to the invention that the platinum component of the calcined platinum sulphite acid is converted to the oxidation state 0 by dry-chemical route. In principle any gaseous or gasifiable reducing agent can be used, by means of which the platinum component can be reduced, such as for example hydrogen, carbon monoxide, ethylene or methanol, ethanol, etc. According to a particularly preferred embodiment of the method according to the invention, it is provided that the platinum component of the calcined platinum sulphite acid is converted to the oxidation state 0 by means of hydrogen.

If hydrogen is used as reducing agent, it can be preferred that the hydrogen is diluted with an inert gas such as for example nitrogen or a noble gas such as helium, neon, argon, krypton and/or xenon, wherein nitrogen is particularly cost-efficient and is accordingly preferred according to the invention. For example, the conversion of the platinum component of the calcined platinum sulphite acid to the oxidation state 0 by reduction in an atmosphere consisting of 0.1 wt.-% to 100 wt.-% hydrogen, preferably 3 to 5 wt.-% hydrogen, and the remainder inert gas is preferred according to the invention.

For example, the conversion of the platinum component of the calcined platinum sulphite acid to the oxidation state 0 by reduction in an atmosphere consisting of 10 wt.-% to 60 wt.-% hydrogen, preferably 15 to 30 wt.-% hydrogen, and the remainder inert gas is furthermore preferred according to the invention.

In order to largely minimize the sulphur content of the platinum catalyst resulting from the method of the invention, it can be provided according to a further preferred embodiment of the method according to the invention that the steps of calcining the impregnated support material under protective gas and of converting the platinum component of the calcined platinum sulphite acid to the oxidation state 0 are carried out several times. For example, the two named method steps can each be carried out 2, 3, 4 or 5 times, wherein the platinum component is converted to the oxidation state 0 after every single calcining step.

It is further preferred within the meaning of the present invention that the reduction is carried out for a duration of at least 1 minute, preferably at least 30 minutes, further preferably at least 1 hour and most preferably of at least 3 hours, wherein a duration of 4 or 5 hours is most preferred.

Within the framework of the present invention, the open-pored support material can be impregnated with platinum sulphite acid in principle according to any method known to a person skilled in the art from the state of the art and considered to be suitable. Examples of methods that are preferred according to the invention are spraying a platinum sulphite acid solution onto the support material, dipping the support material into a platinum sulphite acid solution or the so-called incipient wetness method (pore-filling method), in which there is added to the support material a volume of solution corresponding to the volume of its pores.

If the platinum sulphite acid solution is to be applied by spraying the solution onto the support material, the spraying-on can be carried out according to the present invention by any spraying method known to a person skilled in the art from the state of the art.

If it is provided that the platinum sulphite acid solution is to be applied by dipping the support material into the solution, this is carried out by first dipping the support material into the platinum sulphite acid solution and then—for example by suction—removing from it solution not adhering to the support material surface.

It is particularly preferred according to the invention that the support material is impregnated with platinum sulphite acid by means of the incipient wetness method. In this method, the open-pored support material is loaded with a solution of the impregnating agent—here platinum sulphite acid, wherein the volume of the solution corresponds to the pore volume of the support material, which is why, after being loaded with the solution, the zeolite material is outwardly dry and with it pourable. The incipient wetness method is also known to a person skilled in the art by the name pore-filling method.

The open-pored support material of the present invention is any support material which is known to a person skilled in the art as suitable for the purpose according to the invention. The open-pored support material is preferably an inorganic open-pored support material.

It is further preferred that the open-pored support material is a support material with monomodal or with multimodal pore distribution.

According to a further preferred embodiment of the method according to the invention, the support material comprises a material selected from the group consisting of titanium oxide; γ-, θ- or Δ-aluminium oxide; cerium oxide; silicon oxide; zinc oxide; magnesium oxide; aluminium-silicon oxide; silicon carbide and magnesium silicate or a mixture of two or more of the above-named materials. It can furthermore be preferred that the support material consists of one of the above-named materials or mixtures.

According to a further preferred embodiment of the method according to the invention, it is provided that the support material is a zeolite material. By a zeolite material is meant within the framework of the present invention according to a definition of the International Mineralogical Association (D. S. Coombs et al., Can. Mineralogist, 35, 1997, 1571) a crystalline substance with a structure characterized by a framework of tetrahedra linked together. Each tetrahedron consists of four oxygen atoms which surround a central atom, wherein the framework contains open cavities in the form of channels and cages which are normally occupied by water molecules and extra-framework cations which can often be exchanged. The channels of the material are large enough to allow access to guest compounds. In the hydrated materials, the dehydration mostly occurs at temperatures below about 400° C. and is for the most part reversible.

According to a further preferred embodiment of the method according to the invention, it is provided that the zeolite material is a microporous or a mesoporous zeolite material. By the terms "microporous zeolite material" and "mesoporous zeolite material" are to be understood according to the classification of porous solids according to IUPAC (International Union of Pure and Applied Chemistry) zeolite materials the pores of which have a diameter of less than 2 nm and a diameter of from 2 nm to 50 nm respectively.

The zeolite material to be used in the method according to the invention can preferably correspond to one of the following structure types: ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, CDO, CFI, CGF, CGS, CHA, CHI, CLO, CON, CZP, DAC, DDR, DFO, DFT, DOH, DON, EAB, EDI, EMT, EON, EPI, ERI, ESV, ETR, EUO, EZT, FAR, FAU, FER, FRA, GIS, GIU, GME, GON, GOO, HEU, IFR, IHW, ISV, ITE, ITH, ITW, IWR, IWV, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSE, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SIV, SOD, SOS, SSY, STF, STI, STT, SZR, TER, THO, TON, TSC, TUN, UEI, UFI, UOZ, USI, UTL, VET, VFI, VNI, VSV, WEI, WEN, YUG and ZON, wherein zeolite materials of the structure type Beta (BEA) are particularly preferred. The above nomenclature of three-letter codes corresponds to the "IUPAC Commission of Zeolite Nomenclature".

Also preferred according to the invention are the members of mesoporous zeolite materials of the family which are combined under the name "MCM" in the literature, wherein this name is not a particular structure type (cf. http://www.iza-structure.org/databases). Mesoporous silicates which are called MCM-41 or MCM-48 are particularly preferred according to the invention. MCM-48 has a 3D structure of mesopores, through which the catalytically active metal in the pores is particularly easily accessible. MCM-41 is preferred in particular and has a hexagonal arrangement of mesopores with uniform size. The MCM-41 zeolite material has an $SiO_2$/$Al_2O_3$ molar ratio of preferably more than 100, more preferably of more than 200 and most preferably of more than 300. Further preferred mesoporous zeolite materials which can be used within the framework of the present invention are those which are called MCM-1, MCM-2, MCM-3, MCM-4, MCM-5, MCM-9, MCM-10, MCM-14, MCM-22, MCM-35, MCM-37, MCM-49, MCM-58, MCM-61, MCM-65 or MCM-68 in the literature.

Which zeolite material is to be used in the method according to the invention primarily depends on the purpose of use of the catalyst to be produced by means of the method according to the invention. A large number of methods are known in the state of the art to tailor the properties of zeolite materials, for example the structure type, the pore diameter, the channel diameter, the chemical composition, the ion exchangeability as well as activation properties, to a corresponding purpose of use.

The zeolite material to be used in the method according to the invention can be for example a silicate, an aluminium silicate, an aluminium phosphate, a silicon aluminium phosphate, a metal aluminium phosphate, a metal aluminium phosphosilicate, a gallium aluminium silicate, a gallium silicate, a boroaluminium silicate, a boron silicate or a titanium silicate, wherein aluminium silicates and titanium silicates are particularly preferred.

By the term "aluminium silicate" is meant according to the definition of the International Mineralogical Association (D. S. Coombs et al., Can. Mineralogist, 35, 1997, 1571) a crystalline substance with spatial network structure of the general formula $M^{n+}[(AlO_2)_x(SiO_2)_y] \cdot xH_2O$, which is composed of $SiO_{4/2}$ and $AlO_{4/2}$ tetrahedra which are linked by common oxygen atoms to form a regular three-dimensional network. The atomic ratio of $Si/Al=y/x$ is always greater than/equal to 1 according to the so-called "Löwenstein's rule" which prohibits two neighbouring negatively charged $AlO_{4/2}$ tetrahedra from occurring next to each other. Although more exchange sites are available for metals at a low Si/Al atomic ratio, the zeolite increasingly becomes more thermally unstable.

Within the framework of the present invention, the above-named zeolite materials can be used in the method both in the alkaline form, for example in the Na and/or K form, and in the alkaline earth form, ammonium form or in the H form. In addition, it is also possible to use the zeolite material in a mixed form.

According to a further preferred embodiment of the method according to the invention, it can be provided that a drying step occurs between step a) and step b).

The drying step is carried out between the impregnating and the calcining. The drying temperature is preferably between 25° C. and 250° C., more preferably between 50° C. and 200° C., further preferably between 100° C. and 180° C. and particularly preferably 120° C.

Drying is preferably carried out over a period of more than 1 min, more preferably over a period of more than 1 h, further preferably over a period of more than 5 h and still more preferably over a period of more than 12 h, wherein a drying time of 10 h can be particularly preferred. In this connection, it can moreover be advantageous if the duration of the drying step does not exceed a period of 48 h, preferably does not exceed a period of 24 h.

By the term "calcining" is generally meant heating at high temperatures with the aim of for example materially or structurally altering the treated material or a component thereof. A thermal decomposition, a phase transition or the removal of volatile substances for example can be achieved by a calcining.

Within the framework of the present invention, the calcining is preferably carried out in a temperature range of from 300° C. to 1200° C., more preferably in a temperature range of from 300° C. to 1000° C., further preferably in a temperature range of from 400° C. to 950° C., particularly preferably in a temperature range of from 700 to 900° C. and most preferably in a temperature range of from 730° C. to 900° C.

It is moreover particularly preferred that the calcining is carried out at a temperature of at least 750° C. During a calcining at a temperature of at least 750° C., supported platinum catalysts which, despite high platinum loading of for example 3 wt.-% relative to the weight of the platinum and the open-pored support material, are largely free of sulphur can be obtained by means of the method according to the invention. Thus, by means of the method according to the invention, for example platinum catalysts can be produced which contain 1 to 5 wt.-% platinum, relative to the weight of the platinum and the support material, and have a sulphur content of less than 0.004 wt.-%, relative to the weight of the platinum and the support material. A low sulphur content is particularly advantageous, as sulphur acts as a catalyst poison in particular with regard to noble metals.

The heating rate during the calcining is preferably 0.5° C./min to 5° C./min, more preferably 1° C./min to 4° C./min and particularly preferably 2° C./min.

The duration of the calcining at maximum temperature is preferably in a range of from 1 min to 48 h, more preferably in a range of from 30 min to 12 h and particularly preferably in a range of from 1 h to 7 h, wherein a calcining duration of 5 h or 6 h is particularly preferred.

Within the framework of the present invention, the calcining is carried out under a protective gas. By protective gas are meant gases or gas mixtures which can be used as inert protective atmosphere, for example to prevent unwanted chemical reactions. Within the framework of the present invention, in particular the noble gases helium, neon, argon, krypton or xenon can be used as protective gas, or mixtures of two or more of the above-named, wherein argon is particularly preferred as protective gas. Besides the noble gases or in addition to them, nitrogen for example can also be used as protective gas.

A typical method provided by the present invention comprises the steps of:
a) impregnating an open-pored support material, in particular a zeolite material, in particular a zeolite material of the structure type BEA or a zeolite material from the MCM family, preferably an aluminium silicate or titanium silicate zeolite material, with platinum sulphite acid, in particular with a platinum sulphite acid solution, preferably according to the incipient wetness method;
b) calcining, preferably at a temperature above 750° C., the impregnated support material under protective gas, preferably under argon;
c) optionally converting the platinum component of the calcined platinum sulphite acid to the oxidation state 0, preferably by reduction by means of hydrogen, preferably at a temperature of at least 100° C.

The present invention furthermore relates to a catalyst precursor or a catalyst that can be obtained according to the method according to the invention. By means of the method according to the invention, supported platinum catalysts can be obtained which are characterized by an increased activity as well as by an increased resistance to thermal ageing compared with the corresponding platinum catalysts known in the state of the art, or catalyst precursors can be obtained which can be converted into platinum catalysts with said advantages.

In particular the present invention relates to a catalyst precursor that can be obtained by a method comprising the steps of:
a) impregnating an open-pored support material, in particular a zeolite material, preferably a zeolite material of the structure type BEA or a zeolite material from the MCM family, with platinum sulphite acid according to the incipient wetness method;
b) drying the impregnated support material over a period of 12 h at a temperature of 120° C.;
c) calcining the impregnated and dried support material over a period of 5 h at 790° C. under argon.

In particular the present invention relates in addition to a supported Pt catalyst that can be obtained by a method comprising the steps of:
a) impregnating an open-pored support material, in particular a zeolite material, preferably a zeolite material of the structure type BEA or a zeolite material from the MCM family, with platinum sulphite acid according to the incipient wetness method;
b) drying the impregnated support material over a period of 12 h at a temperature of 120° C.;
c) calcining the impregnated and dried support material over a period of 5 h at 790° C. under argon;
d) converting the platinum component of the calcined platinum sulphite acid to the oxidation state 0 by reducing the platinum component by means of a gas consisting of 5 vol.-% hydrogen in nitrogen over a period of 5 h at a temperature of 300° C.

The present invention furthermore relates to a catalyst comprising an open-pored support material, which is preferably a zeolite material, as well as platinum of oxidation state 0, wherein the XRD spectrum of the catalyst is free of signals of elemental platinum. Such catalysts can be produced by means of the method according to the invention. It is presumed that the XRD spectrum of the catalyst is free of Pt signals, as the outer surface of the support material is substantially free or completely free of metal particles of a size to be able to diffract X-radiation according to the diffraction pattern of platinum.

The zeolite material of the catalyst according to the invention can be understood to mean according to a definition of the International Mineralogical Association (D. S. Coombs et al., Can. Mineralogist, 35, 1997, 1571) a crystalline substance with a structure characterized by a framework of tetrahedra linked together. Each tetrahedron consists of four oxygen atoms which surround a central atom, wherein the framework contains open cavities in the form of channels and cages which are normally occupied by water molecules and extra-framework cations which can often be exchanged. The channels of the material are large enough to allow access to guest compounds. In the hydrated materials, the dehydration mostly occurs at temperatures below about 400° C. and is for the most part reversible.

According to a further preferred embodiment of the catalyst according to the invention, it is provided that the zeolite material is a microporous or a mesoporous zeolite material. By the terms "microporous zeolite material" and "mesoporous zeolite material" are to be understood according to the classification of porous solids according to IUPAC (International Union of Pure and Applied Chemistry) zeolite materials the pores of which have a diameter of less than 2 nm and a diameter of from 2 nm to 50 nm respectively.

The zeolite material of the catalyst according to the invention can preferably correspond to one of the following structure types: ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, CDO, CFI, CGF, CGS, CHA, CHI, CLO, CON, CZP, DAC, DDR, DFO, DFT, DOH, DON, EAB, EDI, EMT, EON, EPI, ERI, ESV, ETR, EUO, EZT, FAR, FAU, FER, FRA, GIS, GIU, GME, GON, GOO, HEU, IFR, IHW, ISV, ITE, ITH, ITW, IWR, IWV, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSE, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SIV, SOD, SOS, SSY, STF, STI, STT, SZR, TER, THO, TON, TSC, TUN, UEI, UFI, UOZ, USI, UTL, VET, VFI, VNI, VSV, WEI, WEN, YUG and ZON, wherein zeolite materials of the structure type Beta (BEA) are particularly preferred. The above nomenclature of three-letter codes corresponds to the "IUPAC Commission of Zeolite Nomenclature".

Also preferred according to the invention are the members of mesoporous zeolite materials of the family which are combined under the name "MCM" in the literature, wherein this name is not a particular structure type (cf. http://www.iza-structure.org/databases). Mesoporous silicates which are called MCM-41 or MCM-48 are particularly preferred according to the invention. MCM-48 has a 3D structure of mesopores, through which the catalytically active metal in the pores is particularly easily accessible. MCM-41 is preferred in particular and has a hexagonal arrangement of mesopores with uniform size. The MCM-41 zeolite material has an $SiO_2$/$Al_2O_3$ molar ratio of preferably more than 100, more preferably of more than 200 and most preferably of more than 300. Further preferred mesoporous zeolite materials which can be used within the framework of the present invention are those which are called MCM-1, MCM-2, MCM-3, MCM-4, MCM-5, MCM-9, MCM-10, MCM-14, MCM-22, MCM-35, MCM-37, MCM-49, MCM-58, MCM-61, MCM-65 or MCM-68 in the literature.

Which zeolite material is contained in the catalyst according to the invention primarily depends on the purpose of use of the catalyst according to the invention. A large number of methods are known in the state of the art to tailor the properties of zeolite materials, for example the structure type, the pore diameter, the channel diameter, the chemical composition, the ion exchangeability as well as activation properties, to a corresponding purpose of use.

The zeolite material of the catalyst according to the invention can be for example a silicate, an aluminium silicate, an aluminium phosphate, a silicon aluminium phosphate, a metal aluminium phosphate, a metal aluminium phosphosilicate, a gallium aluminium silicate, a gallium silicate, a boroaluminium silicate, a boron silicate or a titanium silicate, wherein aluminium silicates and titanium silicates are particularly preferred.

By the term "aluminium silicate" is meant according to the definition of the International Mineralogical Association (D. S. Coombs et al., Can. Mineralogist, 35, 1997, 1571) a crystalline substance with spatial network structure of the general formula $M^{n+}[(AlO_2)_x(SiO_2)_y] \cdot xH_2O$, which is composed of $SiO_{4/2}$ and $AlO_{4/2}$ tetrahedra which are linked by common oxygen atoms to form a regular three-dimensional network. The atomic ratio of Si/Al=y/x is always greater than/equal to 1 according to the so-called "Löwenstein's rule" which prohibits two neighbouring negatively charged $AlO_{4/2}$ tetrahedra from occurring next to each other. Although more exchange sites are available for metals at a low Si/Al atomic ratio, the zeolite increasingly becomes more thermally unstable.

In the catalyst according to the invention, the above-named zeolite materials can be present both in the alkaline form, for example in the Na and/or K form, and in the alkaline earth form, ammonium form or in the H form. In addition, it is also possible that the zeolite material is present in a mixed form, for example in an alkaline/alkaline earth mixed form.

According to a further preferred embodiment of the catalyst according to the invention, it is provided that the catalyst comprises 1 to 10 wt.-% platinum, relative to the weight of the platinum and the support material. It was found that, by means of the method according to the invention, supported platinum catalysts can be obtained the XRD spectra of which are free of platinum signals despite relatively high platinum loading and which have a high resistance to thermal ageing despite relatively high platinum loading. Moreover, it can be provided in this connection according to a further preferred embodiment of the catalyst according to the invention that the catalyst comprises 1 to 10 wt.-% platinum, relative to the weight of the platinum and the support material, more preferably 2 to 5 wt.-%, further preferably 2.2 to 4.5 wt.-%, particularly preferably 2.5 to 3.5 wt.-% and most preferably 3 wt.-%.

According to a further preferred embodiment of the catalyst according to the invention, it is provided that the catalyst is free of further metals of oxidation state 0.

As already stated above, according to a preferred embodiment of the catalyst according to the invention, the support material is a zeolite material of the structure type Beta or a zeolite material from the MCM family.

Furthermore, it can be provided according to a further preferred embodiment of the catalyst according to the invention that the BET surface area of the zeolite material is 100 to 1500 $m^2/g$, preferably 150 to 1000 $m^2/g$ and more preferably 200 to 600 $m^2/g$. The BET surface area is to be determined according to the single-point method by adsorption of nitrogen according to DIN 66132.

According to a further preferred embodiment of the catalyst according to the invention, it can be provided that the catalyst is formed as powder, as shaped body or as monolith. Preferred shaped bodies are for example spheres, rings, cylinders, perforated cylinders, trilobes or cones and a preferred monolith is for example a honeycomb body.

By the dispersion of a supported metal catalyst is meant the ratio of the number of all surface metal atoms of all metal particles of a support to the total number of all metal atoms of the metal particles. In general it is preferred if the dispersion value is relatively high, as in this case as many metal atoms as possible are freely accessible for a catalytic reaction. This means that, given a relatively high dispersion value of a supported metal catalyst, a specific catalytic activity of same can be achieved with a relatively small quantity of metal used. According to a further preferred embodiment of the catalyst according to the invention, the dispersion of the platinum particles is 50 to 100%, preferably 55 to 90%, further preferably 60 to 90%, particularly preferably 75 to 85%. The values of the dispersion are to be determined by means of hydrogen according to DIN 66136-2.

In principle, it is advantageous if the platinum is present in the catalyst according to the invention in particles as small as possible, as the platinum particles then have a very high degree of dispersion. However, a favourable average particle diameter also depends on the application in which the catalyst is to be used, as well as on the pore distribution and in particular the pore radii and channel radii of the support material. According to a preferred embodiment of the catalyst according to the invention, the metal particles have an average diameter which is smaller than the pore diameter and is larger than the channel diameter of the support material. The metal particles are thereby mechanically caught in the support material, which leads to a high resistance to thermal ageing of the catalyst according to the invention. For example, the metal particles have an average diameter of from 0.5 to 5 nm, preferably an average diameter of from 0.5 to 4 nm, more preferably an average diameter of from 0.5 to 3 nm and particularly preferably an average diameter of from 0.5 to 2 nm. The average particle diameter is preferably to be determined by decomposition of the support material and measuring the remaining Pt particles by means of transmission electron microscopy (TEM).

The present invention furthermore relates to the use of a catalyst according to the invention in a catalysis process which is carried out above a temperature of 700° C.

According to a preferred embodiment of the use according to the invention, the catalysis process is a purification of industrial or automotive exhaust gases, such as preferably car, ship, train exhaust gases, etc.

Figure 2:
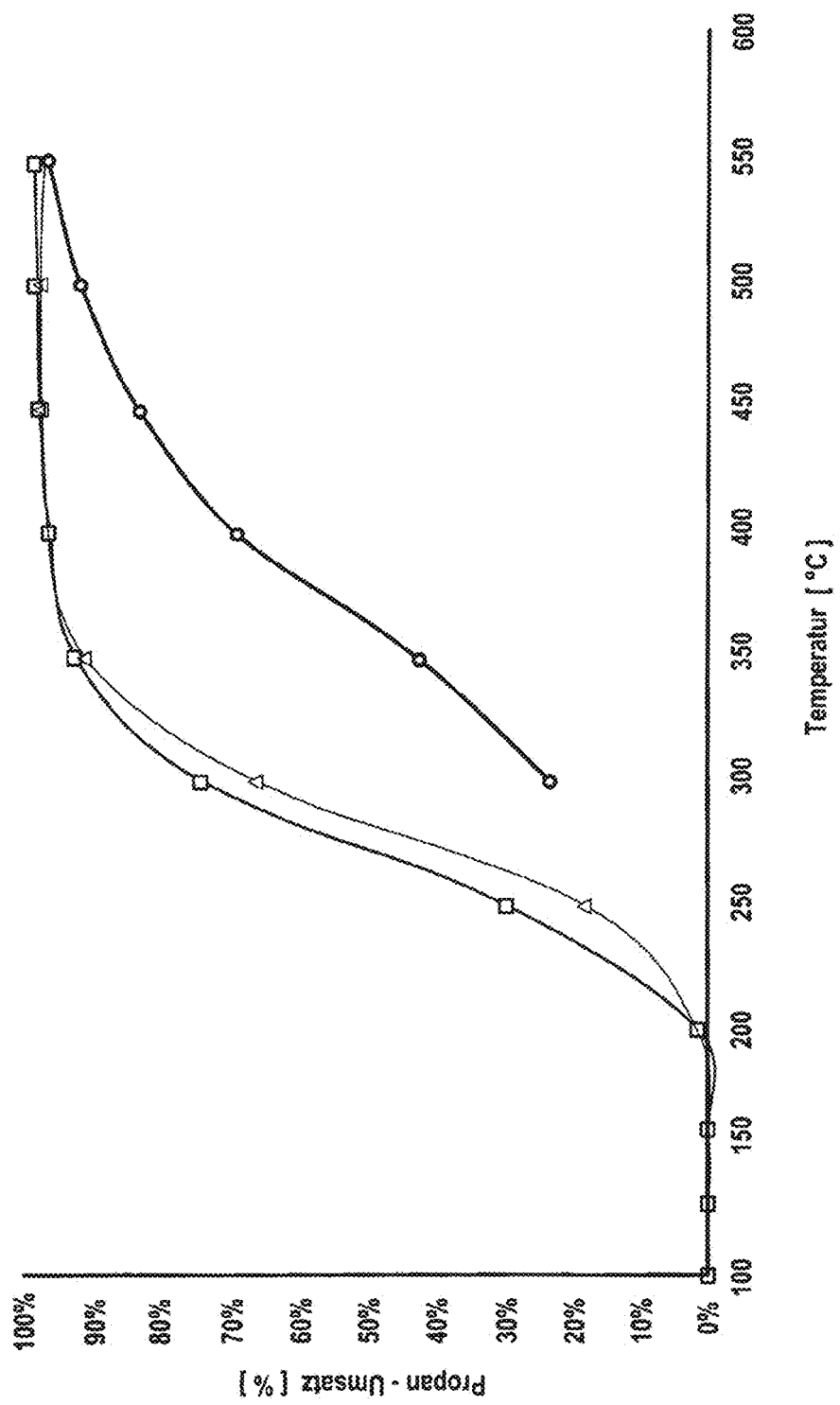
Figure 3:
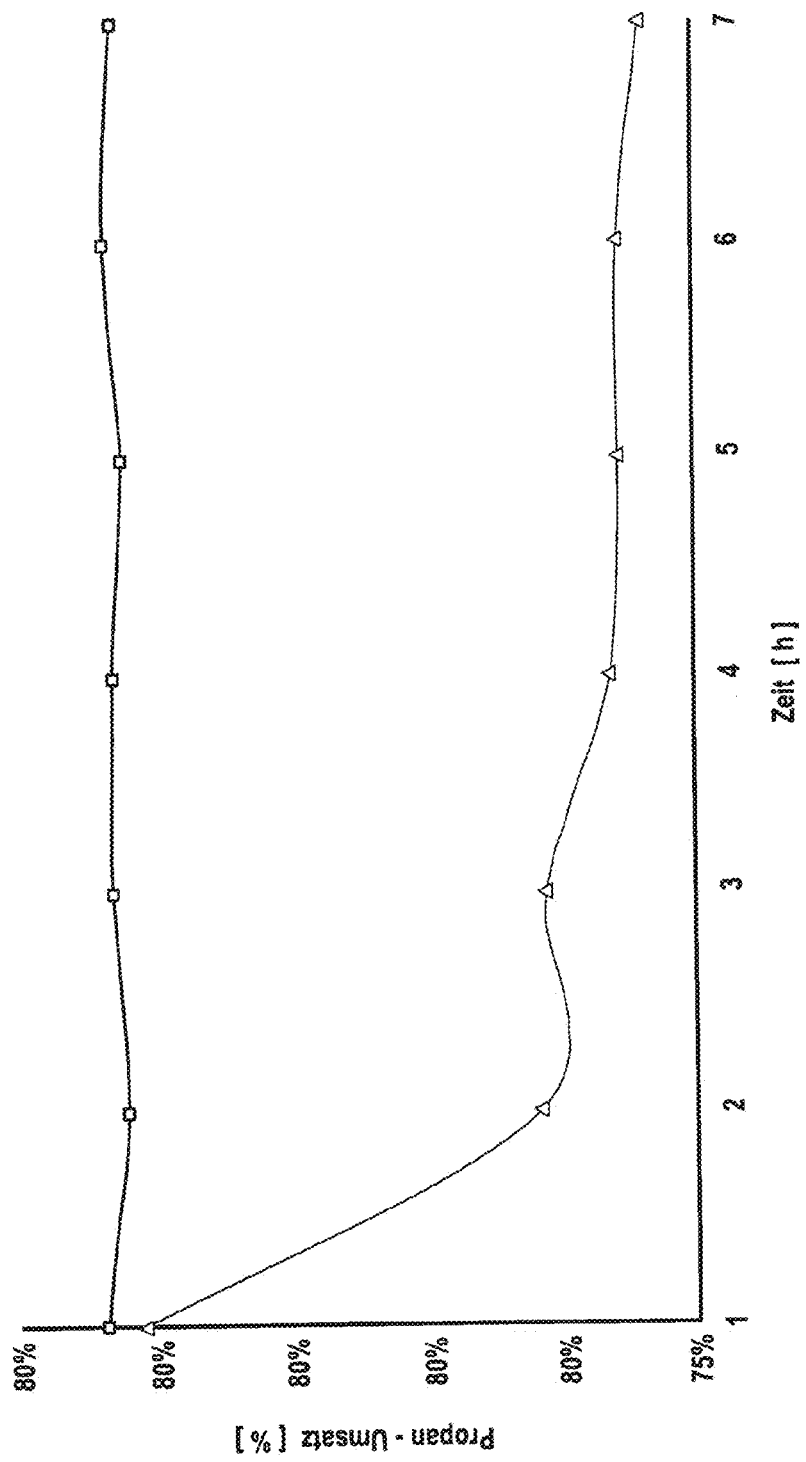
Figure 4:
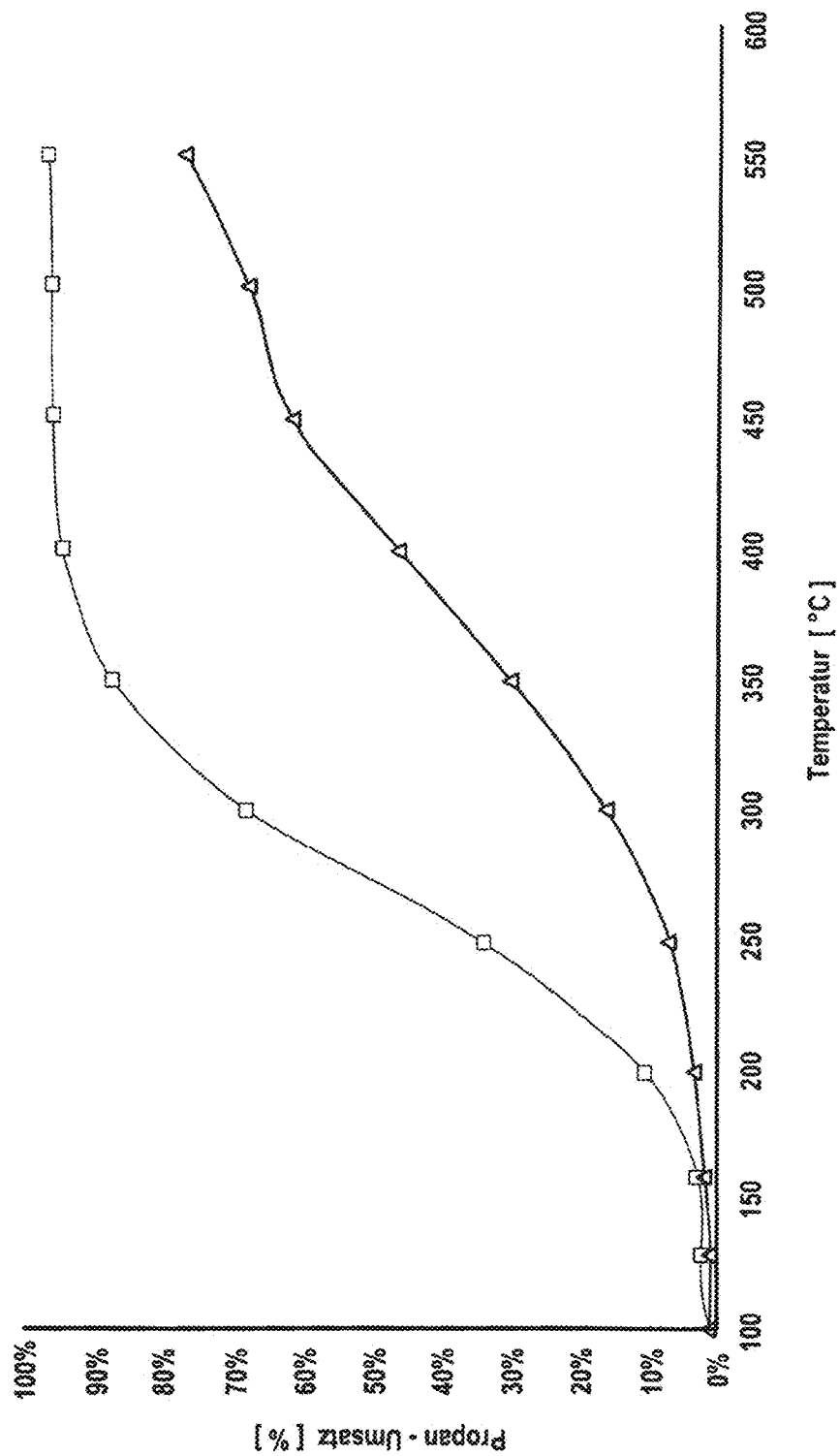
Figure 5:
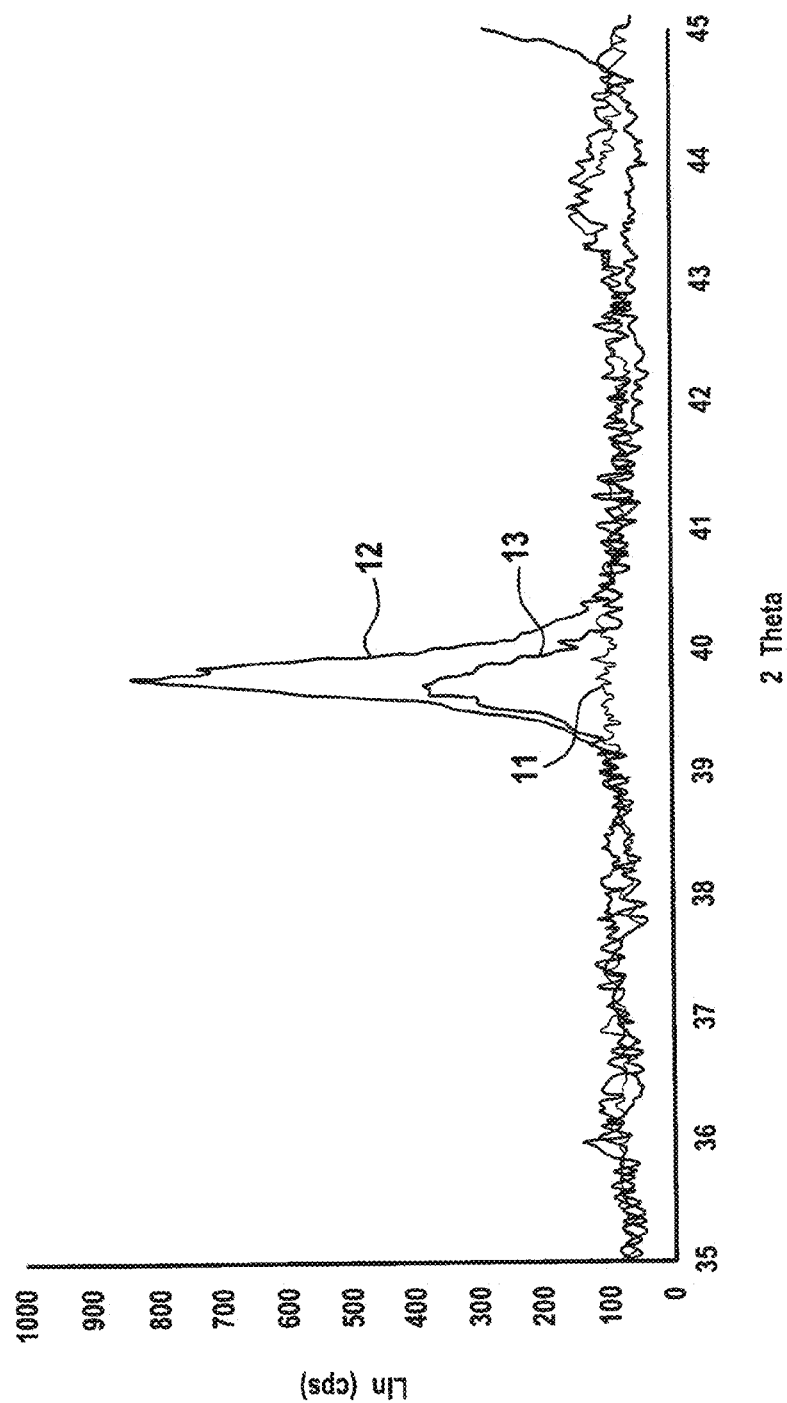
Figure 6:
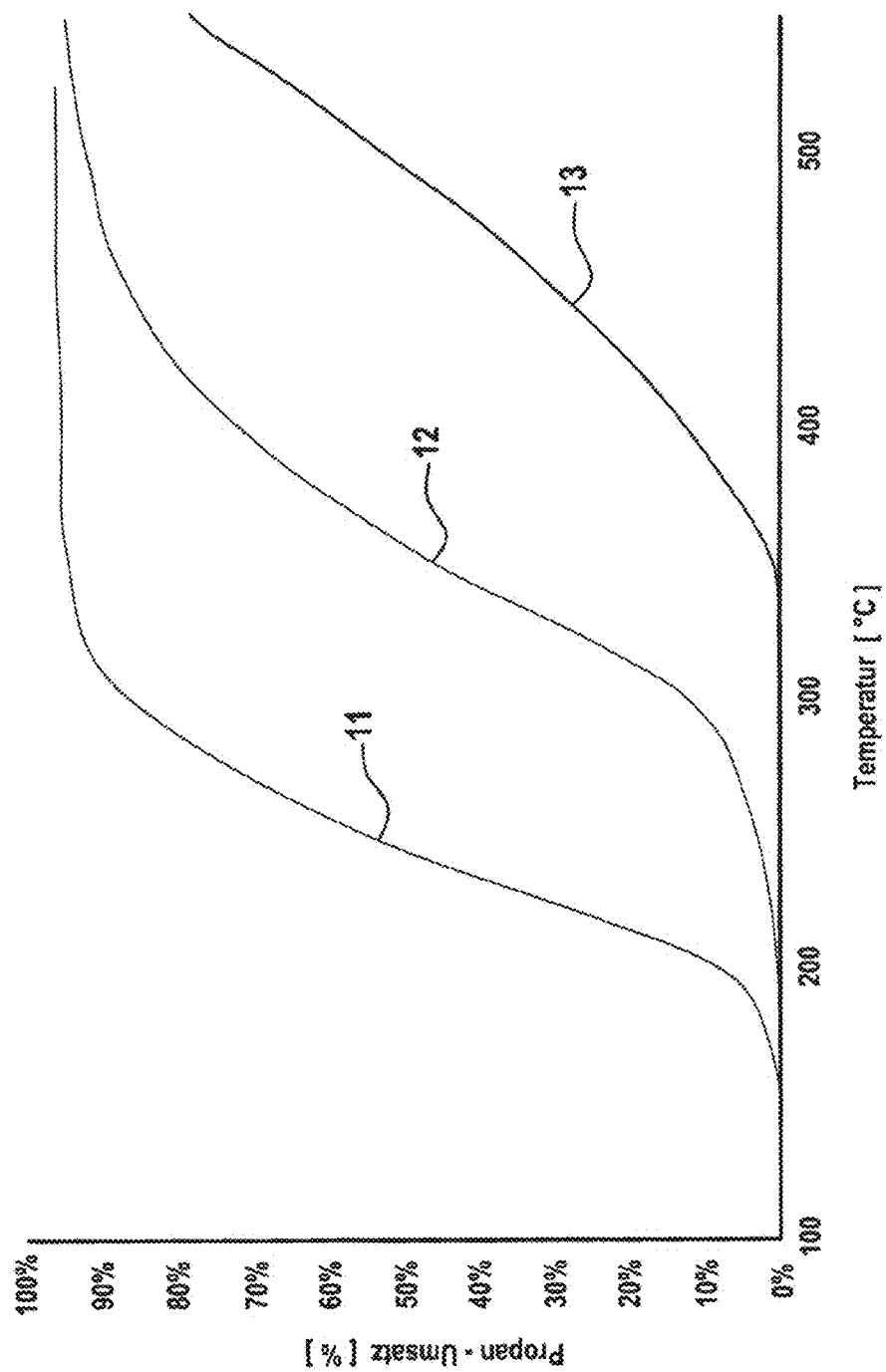

The following examples serve in connection with the drawing to illustrate the invention. There are shown in:

FIG. 1: XRD spectrum of a first catalyst (1) according to the invention produced according to the method according to the invention as well as of a first comparison catalyst (2);

FIG. 2: Propane conversion of the first catalyst (squares), of the first catalyst after ageing (circles) and of the first comparison catalyst (triangles) in the heating phase against the temperature;

FIG. 3: Propane conversion of the first catalyst (squares) and of the first comparison catalyst (triangles) in the constant temperature phase (550° C.) against time;

FIG. 4: Propane conversion of the first catalyst (squares) and of the first comparison catalyst (triangles) in the cooling phase against the temperature;

FIG. 5: XRD spectra (in sections) of a second catalyst (11) according to the invention produced according to the method according to the invention as well as a second (13) and a third (12) comparison catalyst;

FIG. 6: Propane conversion of the second catalyst (11) according to the invention, of the second comparison catalyst (13) and of the third comparison catalyst (12) in the heating phase against the temperature.

Example 1:

A powdery aluminium silicate zeolite material (20 g) of the structure type Beta (BEA) in the H form with an Si/Al2 atomic ratio of 35 was impregnated with 21.9 ml of an aqueous platinum sulphite acid solution containing 3.2 wt.-% Pt (calculated as metal) by means of the incipient wetness method. The absorption of water of dried BEA is (over night at 120° C.) 9.2 g $H_2O$/10 g BEA. 12.96 g $H_2O$ was added to the PSA solution. The solution had a Pt concentration of 3.2 wt.-% (the impregnation was carried out with this solution).

After the impregnation, the zeolite material was dried over night at a temperature of 120° C.

After the drying, the impregnated zeolite material was calcined in an argon atmosphere over a period of 5 h at a temperature of 770° C. The heating rate was 2° C./min and the argon volumetric flow rate during the heating and calcining phase was 2 l/min.

After the calcining, the zeolite material loaded with platinum was reduced at a temperature of 300° C. by means of a gas containing 5 vol.-% hydrogen in nitrogen (2 l/min) over a period of 5 h. The heating rate was 2° C./min.

Example 2:

The catalyst obtained according to Example 1 was calcined in order to age it for a period of 10 h at a temperature of 650° C. in air (heating rate: 10° C./min).

Comparison Example 1:

A catalyst was produced analogously to Example 1, with the only difference that the calcining took place in air.

XRD Measurement 1:

The catalyst produced according to Example 1 and Comparison Example 1 was measured by X-ray diffractometry. The measured XRD spectra are represented in FIG. 1, wherein the spectrum of Example 1 and of Comparison Example 1 are given the reference numbers 1 and 2 respectively.

The XRD spectrum of the catalyst produced according to Example 1 (calcining under argon) displays no Pt signals, whereas the XRD spectrum of the catalyst produced according to Comparison Example 1 (calcining in air) displays clear Pt signals. In fact the signal at a 2-theta value of about 40° is the Pt(110) reflection (110 are the Miller indices), the signal at a 2-theta value of about 46.5° is the Pt(200) reflection.

The absence of Pt reflections in the catalyst according to Example 1 is an indication that, despite the relatively high calcining temperature, no larger platinum clusters have formed on the outer surface of the zeolite material and the platinum is present in the zeolite material predominantly in highly dispersed form.

Elemental Analysis:

Within the framework of a completed elemental analysis, it was established that the catalyst according to Example 1 has a sulphur content of less than 0.004 wt.-%, while the catalyst produced according to Comparison Example 1 has a sulphur content of 0.155 wt.-%.

Activity Test 1:

The catalyst produced according to Examples 1 and 2 as well as according to Comparison Example 1 was subjected to a conversion of propane as activity test under the test conditions below.

Test Conditions:

Particle size: 0.5-1.25 mm
Temperature profile: room temperature (RT)→550° C. (5 h)→RT
Heating rate: 10° C./min
Cooling rate: 20° C./min
CO concentration: 800 ppm
Propane concentration: 200 ppm
Gas hourly space velocity (GHSV): 100 000 $h^{-1}$
Initial weight: 7 g
Catalyst volume: 14 ml FIG. 2 shows the curve shapes of the measured propane conversions in the heating phase against the temperature, FIG. 3 the curve shapes of the propane conversions during the constant temperature phase against time and FIG. 4 shows the curve shapes of the propane conversions in the cooling phase against the temperature, wherein the curve shapes of the catalysts of Examples 1 and 2 and Comparison Example 1 are denoted by squares, circles and triangles respectively.

In the heating phase, the two catalysts according to Example 1 and Comparison Example 1 display the same activity and achieve a conversion of approximately 95% (FIG. 2). During the constant temperature phase, the activity of the catalyst calcined in air according to Comparison Example 1 clearly reduces, whereas the catalyst calcined under argon according to Example 1 displays almost the same activity over the whole constant temperature phase (FIG. 3).

In the cooling phase, the catalyst according to Example 1 also displays an increased activity compared with that of Comparison Example 1 (FIG. 4). The curve shapes for the catalyst according to Example 1 are almost identical in the heating and cooling phases (FIGS. 2 and 4).

The thermally aged catalyst according to Example 2 displays a clearly reduced activity in the range of lower temperatures, but achieves the conversion of the unaged catalyst according to Example 1 at a temperature of 550° C. (FIG. 2).

Comparison Example 2:

20 g of powdery aluminium silicate zeolite material of the structure type MFI (ZSM-5) in the ammonium form with an Si/Al atomic ratio of 27 was impregnated with 3 wt.-% platinum (calculated as metal and relative to the weight of the zeolite material and the platinum) in the form of $(NH_3)_4Pt(NO_3)_2$ by means of the incipient wetness method.

After the impregnation, the zeolite material was dried over night at a temperature of 120° C.

After the drying, the impregnated zeolite material was calcined in an argon atmosphere over a period of 5 h at a temperature of 790° C. The heating rate from room temperature to 300° C. was 0.3° C./min, the heating rate from 300° C. to 790° C. was 4° C./min and the argon volumetric flow rate during the heating and calcining phase was 2 l/min. The decomposition of the $(NH_3)_4Pt(NO_3)_2$ proceeds in a reductive manner, with the result that Pt of oxidation state 0 forms during the calcining.

Comparison Example 3:

A catalyst was produced analogously to Comparison Example 2, with the only difference that a powdery aluminium silicate zeolite material of the structure type Beta (BEA) in the H form with an Si/Al2 atomic ratio of 35 was used as zeolite material.

Example 3:

A catalyst was produced analogously to Comparison Example 2, with the differences that a powdery aluminium silicate zeolite material of the structure type Beta (BEA) in the H form with an Si/Al2 atomic ratio of 35 was used as zeolite material, that the heating rate from room temperature to 790° C. was 2° C./min and that after the calcining the zeolite material loaded with platinum was reduced at a temperature of 300° C. by means of a gas containing 5 vol.-% hydrogen in nitrogen (2 l/min) over a period of 5 h. The heating rate was 2° C./min.

XRD Measurement 2:

The catalysts produced according to Example 3 and according to Comparison Examples 2 and 3 were measured by X-ray diffractometry. The measured XRD spectra are represented in FIG. 5 in sections, wherein the spectrum of Example 3 and of Comparison Examples 2 and 3 are given the reference numbers 11, 13 and 12 respectively.

The XRD spectrum of the catalyst produced according to Example 3 displays no Pt reflections at a 2-theta value of about 40°, whereas the XRD spectra of the catalysts produced according to Comparison Examples 2 and 3 display clear Pt reflections. In fact, the signal at a 2-theta value of about 40° is the Pt(110) reflection.

The absence of Pt reflections in the catalyst according to Example 3 is an indication that no larger platinum particles have formed on the outer surface of the zeolite material and the platinum is present in the zeolite material predominantly in highly dispersed form.

Activity Test 2:

The catalysts produced according to Example 3 as well as according to Comparison Examples 2 and 3 were subjected to a conversion of propane as activity test under the test conditions below.

Test Conditions:
Particle size: 0.5-1.25 mm
Temperature profile: room temperature (RT)→550° C.
Heating rate: 10° C./min
CO concentration: 800 ppm
Propane concentration: 200 ppm
Gas hourly space velocity (GHSV): 100 000 $h^{-1}$
Initial weight: 7 g
Catalyst volume: 14 ml FIG. 6 shows the curve shapes of the measured propane conversions in the heating phase against the temperature, wherein the curve shape of the catalyst according to Example 3 as well as those according to Comparison Examples 2 and 3 are given the reference numbers 11, 13 and 12 respectively. The activity test clearly shows the increased activity of the catalyst according to the invention produced by means of the method according to the invention.

The light-off temperatures at which 50% of the propane used is converted are 243° C. for the catalyst produced according to Example 3 and 498° C. and 356° C. for the catalysts produced according to Comparison Examples 2 and 3 respectively.

The invention claimed is:

1. A method for producing a platinum catalyst precursor comprising the steps of:
   a) impregnating an open-pored support material with platinum sulfite acid;
   b) calcining the impregnated support material under a protective gas; and
   c) converting the platinum component of the calcined platinum sulfite acid to the oxidation state 0.

2. The method according to claim 1, wherein the platinum component of the calcined platinum sulfite acid is converted to the oxidation state 0 at a temperature of at least 100° C.

3. The method according to claim 1, wherein the platinum component of the calcined platinum sulfite acid is converted to the oxidation state 0 by means of hydrogen.

4. The method according to claim 1, wherein the steps of calcining the impregnated support material under protective gas and of converting the platinum component of the calcined platinum sulfite acid to the oxidation state 0 are carried out at least two times.

5. The method according to claim 1, wherein the impregnating is carried out by means of the incipient wetness method.

6. The method according to claim 1, wherein the support material is an inorganic support material.

7. The method according to claim 6, wherein the support material comprises a material selected from the group consisting of titanium oxide; γ-, θ- or Δ-aluminum oxide; cerium oxide; silicon oxide; zinc oxide; magnesium oxide; aluminum-silicon oxide; silicon carbide, magnesium silicate and mixtures thereof.

8. The method according to claim 1, wherein the support material is a zeolite material.

9. The method according to claim 8, wherein the zeolite material is a microporous or a mesoporous zeolite material.

10. The method according to claim 8, wherein the zeolite material is a zeolite material of the structure type Beta.

11. The method according to claim 8, wherein the zeolite material is a zeolite material from the mesoporous zeolite materials family.

12. The method according to claim 8, wherein the zeolite material is an aluminum silicate or a titanium silicate.

13. The method according to claim 1, wherein a drying step occurs between step a) and step b).

14. The method according to claim 1, wherein the calcining is carried out at a temperature of at least 750° C.

15. The method according to claim 1, wherein the protective gas is argon.

* * * * *